(12) United States Patent
Coyt

(10) Patent No.: US 11,575,251 B2
(45) Date of Patent: Feb. 7, 2023

(54) THERMOSTAT BRACKET ASSEMBLY

(71) Applicant: Manuel Coyt, Stockton, CA (US)

(72) Inventor: Manuel Coyt, Stockton, CA (US)

( * ) Notice: Subject to any disclaimer, the term of this patent is extended or adjusted under 35 U.S.C. 154(b) by 0 days.

(21) Appl. No.: 17/405,140

(22) Filed: Aug. 18, 2021

(65) Prior Publication Data
US 2022/0069557 A1   Mar. 3, 2022

Related U.S. Application Data

(60) Provisional application No. 63/071,013, filed on Aug. 27, 2020.

(51) Int. Cl.
  *H02G 3/00* (2006.01)
  *H02G 3/04* (2006.01)
  *F16L 5/00* (2006.01)

(52) U.S. Cl.
  CPC .............. *H02G 3/0456* (2013.01); *F16L 5/00* (2013.01); *H02G 3/0406* (2013.01)

(58) Field of Classification Search
  None
  See application file for complete search history.

(56) References Cited

U.S. PATENT DOCUMENTS

| | | | |
|---|---|---|---|
| 3,730,472 A | 5/1973 | Dale | |
| 4,119,936 A * | 10/1978 | Laviana | G05D 23/32 236/46 R |
| 5,587,555 A | 12/1996 | Rinderer | |
| 6,315,261 B1 | 11/2001 | Snyder | |
| 8,076,578 B1 * | 12/2011 | Gretz | H02G 3/126 439/535 |
| D736,105 S | 8/2015 | Hoyt | |
| 9,562,628 B2 | 2/2017 | Nuerenberger | |
| 2007/0194188 A1 * | 8/2007 | Johnson | H02G 3/126 248/218.4 |
| 2011/0154673 A1 | 6/2011 | Herth | |
| 2014/0331598 A1 * | 11/2014 | White | A47K 3/04 52/775 |
| 2015/0059282 A1 * | 3/2015 | Gerst | F16B 7/00 52/712 |
| 2017/0188122 A1 * | 6/2017 | Moro | H04R 1/026 |

FOREIGN PATENT DOCUMENTS

WO   WO-9729267 A1 *   8/1997   ............ E06B 1/6015

* cited by examiner

*Primary Examiner* — Steven M Marsh

(57) ABSTRACT

A thermostat bracket assembly includes a bracket that has a first portion forming an angle with a second portion. The first portion can be mounted to a wall stud having the second portion oriented planar with a panel of sheetrock mounted to the wall stud. A pair of engagements is each integrated into the bracket and each of the engagements is aligned with an intersection between the wall stud and the panel of sheetrock. A thermostat wire is extended through a respective one of the engagements to inhibit the thermostat wire from being lost in the wall cavity.

6 Claims, 2 Drawing Sheets

THERMOSTAT BRACKET ASSEMBLY

CROSS-REFERENCE TO RELATED APPLICATIONS

I hereby claim the benefit under 35 U.S.C. Section 119(e) of U.S. Provisional application 63/071,013 filed on Aug. 27, 2020

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bracket devices and more particularly pertains to a new bracket device for inhibiting a thermostat wire from being lost in a wall cavity.

(2) Description of Related Art Including Information Disclosed Under 37 CFR 1.97 and 1.98

The prior art relates to bracket devices including an angled bracket that also has an arm angling away from angled bracket. The prior art discloses a conductor bracket that includes a plurality of tunnels for having conductors routed therethrough. The prior art discloses a thermostat wire holder that includes a first portion forming an acute angle with a second portion and which includes wire openings for having a thermostat wire being routed therethrough. The prior art also discloses a wire bracket that includes a pair of jaws for engaging a wire.

BRIEF SUMMARY OF THE INVENTION

An embodiment of the disclosure meets the needs presented above by generally comprising a bracket that has a first portion forming an angle with a second portion. The first portion can be mounted to a wall stud having the second portion oriented planar with a panel of sheetrock mounted to the wall stud. A pair of engagements is each integrated into the bracket and each of the engagements is aligned with an intersection between the wall stud and the panel of sheetrock. A thermostat wire is extended through a respective one of the engagements to inhibit the thermostat wire from being lost in the wall cavity.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
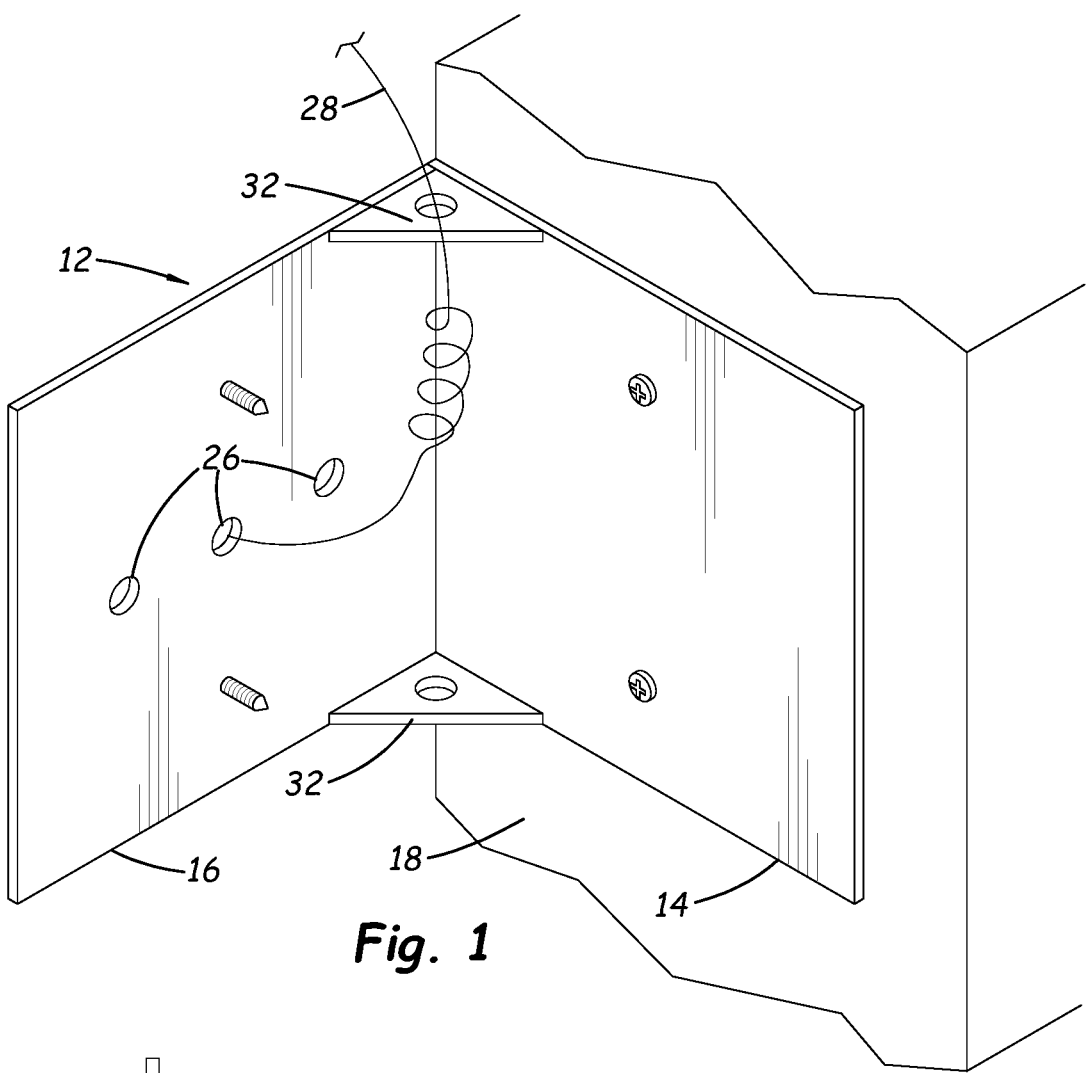
FIG. 1 is a perspective in-use view of a thermostat bracket assembly according to an embodiment of the disclosure.
Figure 2:
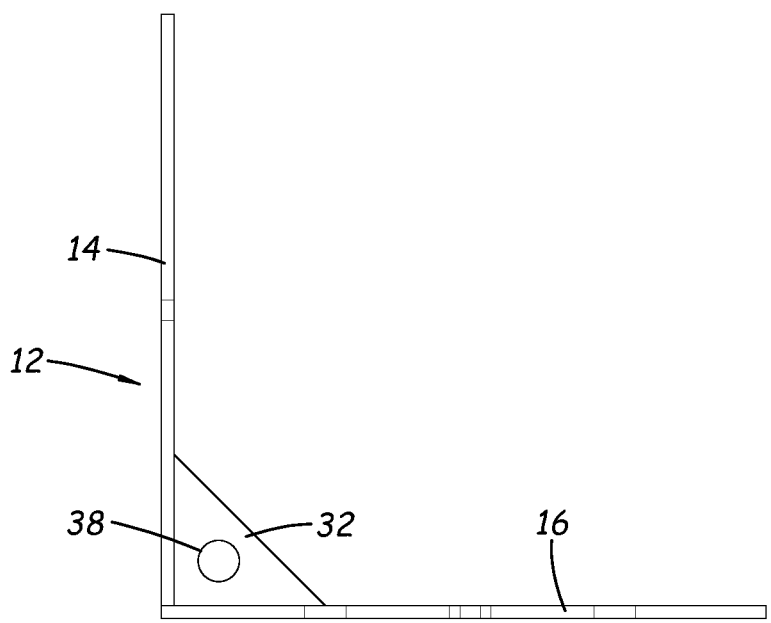
FIG. 2 is a top view of an embodiment of the disclosure.
Figure 3:
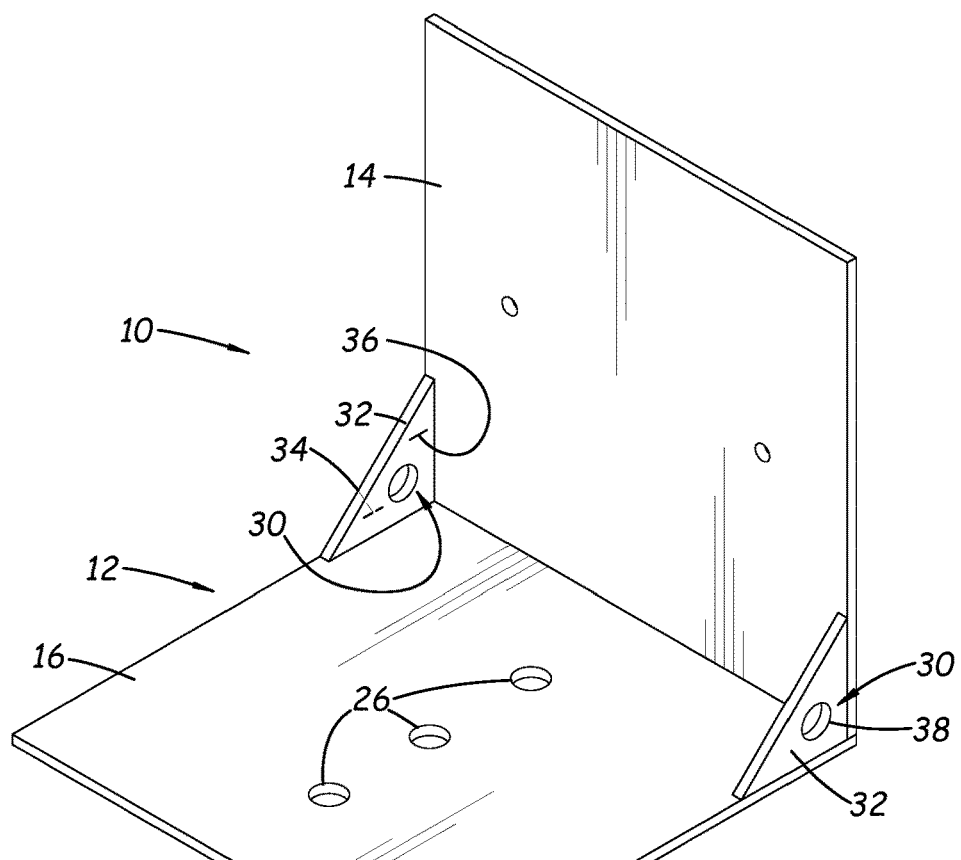
FIG. 3 is a perspective view of an embodiment of the disclosure.
Figure 4:
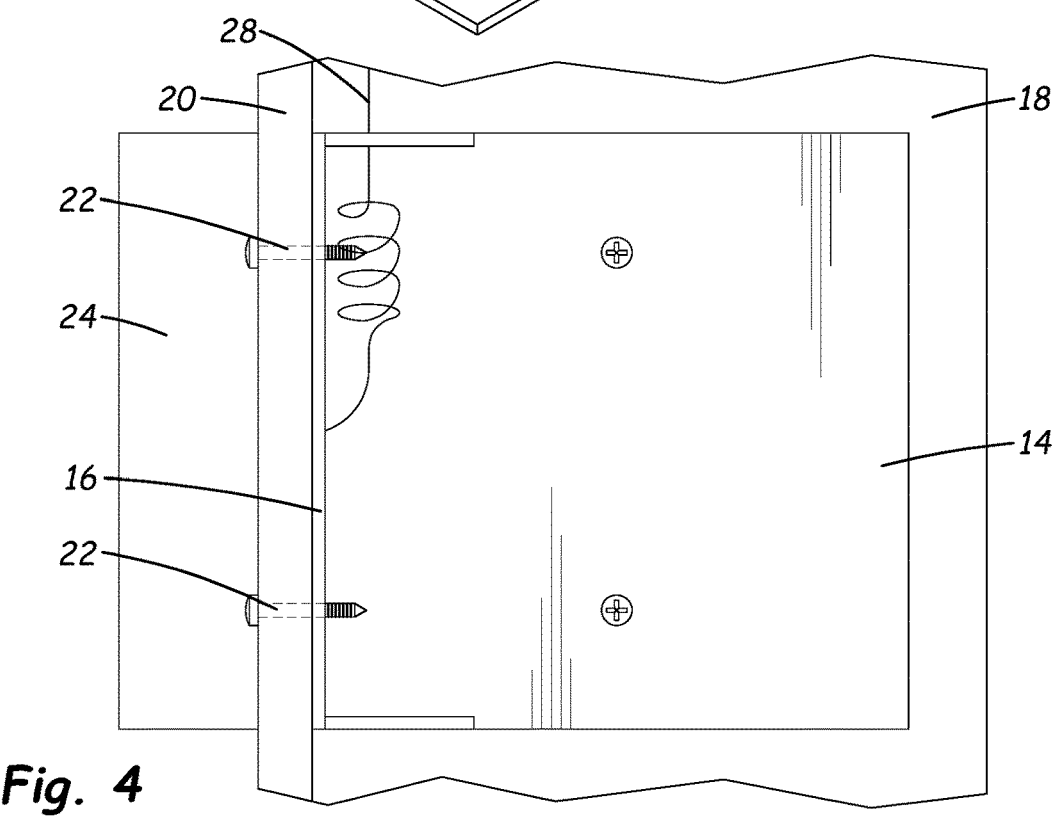
FIG. 4 is a side in-use view of an embodiment of the disclosure.

With reference now to the drawings, and in particular to FIGS. 1 through 4 thereof, a new bracket device embodying the principles and concepts of an embodiment of the disclosure and generally designated by the reference numeral 10 will be described.

As best illustrated in FIGS. 1 through 4, the thermostat bracket assembly 10 generally comprises a bracket 12 that has a first portion 14 forming a perpendicular angle with a second portion 16. The first portion 14 can be mounted to a wall stud 18 having the second portion 16 being planar with a panel of sheetrock 20 mounted to the wall stud 18. Additionally, the second portion 16 is comprised of a penetrable material to facilitate fasteners 22 from a thermostat 24 to engage the second portion 16. In this way the thermostat 24 can be mounted on the panel of sheetrock 20 without using wall anchors or other fasteners that are commonly employed to attach objects to sheetrock 20.

The second portion 16 has a plurality of wire openings 26 each extending therethrough. A thermostat wire 28 can be extended through a respective one of the wire openings 26. In this way the thermostat wire 28 can be routed into the thermostat 24. The bracket 12 has a pair of engagements 30 each being integrated into the bracket 12 and each of the engagements 30 is aligned with an intersection between the wall stud 18 and the panel of sheetrock 20. The thermostat wire 28 is extended through a respective one of the engagements 30 to inhibit the thermostat wire 28 from being lost in the wall cavity.

A pair of gussets 32 is each coupled between the first portion 14 and the second portion 16 for inhibiting the first portion 14 from deflecting from the second portion 16. Each of the gussets 32 has a top surface 34 and a bottom surface 36, and each of the gussets 32 has a hole 38 extending through the top surface 34 and the bottom surface 36. Moreover, the hole 38 in each of the gussets 32 defines a respective one of the engagements 30.

In use, the first portion 14 of the bracket 12 is mounted to the wall stud 18 such that the panel of sheetrock 20 lies against the second portion 16 when the panel of sheetrock 20 is installed on the wall stud 18. Additionally, the thermostat wire 28 is routed through the hole 38 in a respective one of the gussets 32, prior to installing the panel of sheetrock 20, for retaining the thermostat wire 28 in a preferred location. In this way the thermostat wire 28 can be easily located when the thermostat 24 is installed on the panel of sheetrock 20. Additionally, the second portion 16 of the bracket 12 facilitates the thermostat 24 to be attached to the panel of sheetrock 20 with traditional screws rather than employing wall anchors, and other sheetrock 20 specific fasteners, which can potentially fail. The thermostat wire 28 can be routed through the respective wire opening 26 in the second portion 16 to extend the thermostat wire 28 into the thermostat 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A thermostat mounting bracket assembly for retaining a thermostat wire in a preferred orientation behind a panel of sheetrock, said assembly comprising:
   a bracket having a first portion forming a perpendicular angle with a second portion wherein said first portion is configured to be mounted to a wall stud having said second portion being planar with a panel of sheetrock mounted to the wall stud, said bracket having a pair of engagements being integrated into said bracket wherein each of said engagements is configured to be aligned with an intersection between the wall stud and the panel of sheetrock, a respective one of said engagements having the thermostat wire extended therethrough wherein said respective engagement is configured to inhibit the thermostat wire from being lost in a wall cavity.

2. The assembly according to claim 1, wherein said second portion is comprised of a penetrable material wherein said second portion is configured to facilitate a fastener from a thermostat to engage said second portion for mounting the thermostat on the panel of sheetrock.

3. The assembly according to claim 1, wherein said second portion has a plurality of wire openings each extending therethrough wherein a respective one of said wire openings is configured to have a thermostat wire routed into a thermostat.

4. The assembly according to claim 1, further comprising a pair of gussets, each of said gussets being coupled between said first portion and said second portion for inhibiting said first portion from deflecting from said second portion.

5. The assembly according to claim 4, wherein each of said gussets has a top surface and a bottom surface, each of said gussets having a hole extending through said top surface and said bottom surface, said hole in each of said gussets defining a respective one of said engagements.

6. A thermostat mounting bracket assembly for retaining a thermostat wire in a preferred orientation behind a panel of sheetrock, said assembly comprising:
   a bracket having a first portion forming an angle with a second portion wherein said first portion is configured to be mounted to a wall stud having said second portion being planar with a panel of sheetrock mounted to the wall stud, said second portion being comprised of a penetrable material wherein said second portion is configured to facilitate fastener from a thermostat to engage said second portion for mounting the thermostat on the panel of sheetrock, said second portion having a plurality of wire openings each extending therethrough wherein a respective one of said wire opening is configured to have a thermostat wire routed therethrough to route the thermostat wire into the thermostat, said bracket having a pair of engagements being integrated into said bracket wherein each of said engagements is configured to be aligned with an intersection between the wall stud and the panel of sheetrock, a respective one of said engagements having the thermostat wire extended therethrough wherein said respective engagement is configured to inhibit the thermostat wire from being lost in a wall cavity; and
   a pair of gussets, each of said gussets being coupled between said first portion and said second portion for inhibiting said first portion from deflecting from said second portion, each of said gussets having a top surface and a bottom surface, each of said gussets having a hole extending through said top surface and said bottom surface, said hole in each of said gussets defining a respective one of said engagements.

* * * * *